US011933165B2

(12) United States Patent
Tello Gomez et al.

(10) Patent No.: US 11,933,165 B2
(45) Date of Patent: Mar. 19, 2024

(54) HYDRAULIC FRACTURE CONDUCTIVITY MODELING (71) Applicant: Saudi Arabian Oil Company, Dhahran (SA)

(72) Inventors: Adan Hanniel Tello Gomez, Dhahran (SA); Abdelhafidh Fekkane, Dammam (SA); Jubril Babajide Oluwa, Dhahran (SA); Adel Al-Qahtani, Al Khubar (SA)

(73) Assignee: Saudi Arabian Oil Company, Dhahran (SA)

( * ) Notice: Subject to any disclaimer, the term of this patent is extended or adjusted under 35 U.S.C. 154(b) by 316 days.

(21) Appl. No.: 17/201,055

(22) Filed: Mar. 15, 2021

(65) Prior Publication Data

US 2022/0290557 A1 Sep. 15, 2022

(51) Int. Cl.
*G06F 30/20* (2020.01)
*E21B 43/26* (2006.01)
(Continued)

(52) U.S. Cl.
CPC .............. *E21B 47/12* (2013.01); *E21B 43/26* (2013.01); *E21B 44/00* (2013.01); *E21B 49/00* (2013.01);
(Continued)

(58) Field of Classification Search
CPC ........ E21B 47/12; E21B 47/138; E21B 43/26; E21B 43/2605; E21B 43/2607;
(Continued)

(56) References Cited

U.S. PATENT DOCUMENTS 8,078,405 B2 12/2011 Delorme et al.
8,521,494 B2 8/2013 Narr et al.
(Continued)

FOREIGN PATENT DOCUMENTS

| CN | 109829217 A | 5/2019 |
| CN | 110700806 A | 1/2020 |
| WO | 2020167282 A1 | 8/2020 |

OTHER PUBLICATIONS

Fisher, Kevin, and Norm Warpinski. "Hydraulic-fracture-height growth: Real data." SPE Production & Operations 27.01 (2012): 8-19. (Year: 2012).*

(Continued)

*Primary Examiner* — Michael Edward Cocchi
(74) *Attorney, Agent, or Firm* — Bracewell LLP; Constance G. Rhebergen; Brian H. Tompkins (57) ABSTRACT

Techniques for developing a hydrocarbon well employing hydraulic fracturing, including determining a geometric signature of a bi-wing hydraulic fracture of the well, including a fracture height ($h_f$), half-length ($X_f$) and width ($w_f$) of the fracture, determining fracture model parameters for the fracture, including a stimulated cell width ($D_y$), length ($D_x$), and width (n), determining a fracture conductivity diluting factor (FCDF) for the bi-wing hydraulic fracture based on the geometric signature and the fracture model parameters, applying the FCDF to a fracture permeability ($K_f$) to determine a model permeability ($K_{fm}$) for the fracture, and determining a reservoir model of the reservoir that includes the model permeability ($K_{fm}$) associated with the cells of the reservoir model that represent a region of the hydrocarbon reservoir that corresponds to the location of the hydraulic fracture.

11 Claims, 5 Drawing Sheets (51) Int. Cl.
*E21B 44/00* (2006.01)
*E21B 47/12* (2012.01)
*E21B 49/00* (2006.01)
*G06F 111/10* (2020.01)

(52) U.S. Cl.
CPC .......... *G06F 30/20* (2020.01); *E21B 2200/20* (2020.05); *G06F 2111/10* (2020.01)

(58) Field of Classification Search
CPC .......... E21B 43/27; E21B 44/00; E21B 49/00; E21B 2200/20; E21B 33/00; E21B 41/00; E21B 41/0092; E21B 41/0099; G06F 30/20; G06F 30/25; G06F 30/27; G06F 30/28; G06F 2111/10
See application file for complete search history.

(56) References Cited

U.S. PATENT DOCUMENTS

| | | | |
|---|---|---|---|
| 8,983,818 B2 | 3/2015 | Fourno et al. | |
| 10,060,226 B2 | 8/2018 | Dusterhoft et al. | |
| 2009/0250211 A1* | 10/2009 | Craig | E21B 43/26 166/250.16 |
| 2013/0073268 A1 | 3/2013 | Abacioglu et al. | |
| 2017/0145793 A1 | 5/2017 | Ouenes | |
| 2017/0191348 A1 | 7/2017 | Althawad et al. | |
| 2018/0181692 A1 | 6/2018 | Khudorozhkov et al. | |
| 2019/0120022 A1* | 4/2019 | Zanon | G06F 30/28 |
| 2019/0292884 A1 | 9/2019 | McClure | |
| 2019/0309603 A1 | 10/2019 | Sepehrnoori et al. | |
| 2020/0056460 A1 | 2/2020 | Isaev et al. | |
| 2020/0348445 A1 | 11/2020 | Liu et al. | |

OTHER PUBLICATIONS

International Search Report and Written Opinion for International Application No. PCT/US2022/020208 report dated Jun. 3, 2022; pp. 1-15.

Dobbs, M.R. et al.; "Review of software used by the oil and gas industry to model hydraulic fracturing" Project SC170020, Environment Agency, Horizon House, Deanery Road, Bristol, UK BS1 5AH, Oct. 2019; pp. 1-28.

Wu, Kan; "Numerical Modeling of Complex Hydraulic Fracture Development in Unconventional Reservoirs" Dissertation Presented to the Faculty of the Graduate School of the University of Texas at Austin, Dec. 2014; pp. 1-261.

* cited by examiner

HYDRAULIC FRACTURE CONDUCTIVITY MODELING

FIELD

Embodiments relate generally to developing hydrocarbon wells, and more particularly to modeling and operating hydrocarbon wells based on hydraulic facture conductivity.

BACKGROUND

A well typically includes a wellbore (or a "borehole") that is drilled into the earth to provide access to a geologic formation that resides below the earth's surface (or a "subsurface formation"). A well may facilitate the extraction of natural resources, such as hydrocarbons and water, from a subsurface formation, facilitate the injection of substances into the subsurface formation, or facilitate the evaluation and monitoring of the subsurface formation. In the petroleum industry, hydrocarbon wells are often drilled to extract (or "produce") hydrocarbons, such as oil and gas, from subsurface formations.

Developing a hydrocarbon well for production typically involves a drilling stage, a completion stage and a production stage. The drilling stage involves drilling a wellbore into a portion of the formation that is expected to contain hydrocarbons (often referred to as a "hydrocarbon reservoir" or a "reservoir"). The drilling process is often facilitated by a drilling rig that provides for a variety of drilling operations, such as operating a drill bit to cut the wellbore. The completion stage involves operations for making the well ready to produce hydrocarbons, such as installing casing, installing production tubing, installing valves for regulating production flow, or pumping substances into the well to fracture, clean or otherwise prepare the well and reservoir to produce hydrocarbons. The production stage involves producing hydrocarbons from the reservoir by way of the well. During the production stage, the drilling rig is typically replaced with a production tree that includes valves that are operated to, for example, regulate production flow rate and pressure. The production tree typically includes an outlet that is connected to a distribution network of midstream facilities, such as tanks, pipelines or transport vehicles, that transport production from the well to downstream facilities, such as refineries or export terminals.

Developing a hydrocarbon well can include a variety of challenges that need to be addressed. During well completion and production operations, for example, a well operator typically selects and employs operations to optimize the production of hydrocarbons from reservoir by way of the well. This can include conducting hydraulic fracturing type stimulation operations to increase the effective permeability of formation rock, which can, in turn, facilitate the flow of hydrocarbons through the formation rock. In many instances, well operations and parameters for well extending into a reservoir are selected based on modeling of the reservoir and associated wells.

SUMMARY

Understanding the characteristics of a well, and the formation rock surrounding the well, can be a critical aspect of effectively and efficiently developing a hydrocarbon well. For example, understanding and predicting how fluids flow through formation rock of a reservoir surrounding a well can be critical in determining how to develop the well and other wells in the reservoir. Conductivity is one characteristic that can be helpful in understanding and predicting how fluids flow through formation rock. Conductivity of formation rock is often characterized by permeability, a measure of how easily fluids can pass though the rock. A higher permeability indicates that fluids can flow relatively easily through the rock (e.g., the rock is more permeable), and lower permeability typically indicates that fluids may not flow as easily through the rock (e.g., the rock is less permeable). In many instances, a relatively high conductivity is desirable because it can facilitate the flow of production, such as oil and gas, to production wells. Well operators often conduct stimulation operations in an effort to increase conductivity. For example, a well operator may conduct hydraulic fracturing type stimulation of a well in an effort to increase formation rock conductivity, which can, in turn, promote flow of hydrocarbons to wells.

Although stimulation techniques (including hydraulic fracturing) can be effective in enhancing production, understanding and optimizing the impact of stimulations can be difficult. Operators often conduct reservoir assessments, such as modeling and simulation of wells and reservoirs, in an effort to understand the impact of stimulation operations, such as hydraulic fracturing. A reservoir model typically represents characteristics of the associated formation rock and one or more wells extending into the reservoir. A simulation typically involves predicting, using a model as a basis, how fluids will flow within the reservoir and how the wells will perform as a result of an operational scenario. Simulations are often run in multiple scenarios to determine likely outcomes, and the formation and wells are typically assessed and developed based on an analysis of the scenarios providing a desirable simulation result. For example, in the case of a well that has been (or is expected to be) subjected to hydraulic fracturing, a well operator may create a model of the well that takes into account an area of the formation that is believed to have been fractured (or that is expected to be fractured), and may run a simulation using the model to determine how the well will perform under different sets of operating parameters, such as different production pressures and flowrates. The operator may determine a desirable set of operating parameters based on the results of the simulations and operate the well in accordance with set of operating parameters. These types of simulations can be competed for multiple wells and operating scenarios, and a reservoir model may be updated and simulated over the course of development of the reservoir in an effort to adapt to observed and changing conditions and goals.

Reservoir models typically include a large number of cells (e.g., a three-dimensional (3D) grid of thousands or millions of rectangular cells) that each represent respective portions of a reservoir, and together represent all of the reservoir (or at least a larger portion of the reservoir). In a model, each of the cells is typically associated with an initial set of characteristics, such as permeability, porosity, oil and water saturation determined for the corresponding portion of the reservoir. Simulation of the model typically involves iteratively updating those characteristics based on calculated interactions between the cells to predict the movement of fluids within the reservoir. Thus, simulations can be highly dependent on an accurate modeling of cell characteristics. It is not uncommon for models to include millions of cells, which can generate an immense amount of processing overhead during a simulation run. Simulation techniques, such as local grid refinement (LGR) or sector modeling, have been employed in an effort to improve modeling and simulation accuracy. Unfortunately, these types of techniques normally increase the number of cells and increase processing overhead, which can be detrimental to the efficiency and effectiveness of a simulation, and increase the processing time required for the simulation. Accordingly, it is desirable to strike a balance between modeling and simulation accuracy with performance, especially in the context of characteristics that are difficult to quantify, such as permeability of a stimulated formation rock.

In some embodiments, a fracture conductivity diluting factor (FCDF) is determined and employed within cell-based modeling of a full-field reservoir model to provide a computationally efficient and accurate alternative to traditional hydraulic fracture modeling. The FCDF may represents the influence of a hydraulic fracture and may be applied to "field" values of permeability for cells in the area of the hydraulic fracture to account for volumetric characteristics of the fracture. This can help to reduce or eliminate reliance on processing intensive simulation techniques for characterizing hydraulic fractures and their impact. The FCDF associated with a hydraulic fracture may be applied to the permeability of cells representing the area of the fracture to account for volumetric characteristics of the fracture. This can reduce or eliminate the need for processing intensive simulation techniques for characterizing the fracture and its impact, which can undesirably increase processing overhead and processing time. In some embodiments, a FCDF associated with a hydraulic fracture is based on the geometry of the fracture itself (e.g., the fracture's width, length and height) and the geometry of the associated modeling of the reservoir (e.g., the size and number of cells corresponding to the location of the fracture). In the case of a set of cells that are intersected by a fracture and that have a "field" permeability associated therewith, the FCDF for the fracture may be applied to the field permeability of the cells to generate a "model" permeability for the cells. The model permeability may be associated with the cells of a reservoir model that are associated with the fracture, and simulation of the reservoir model may include employing the model permeability for the cells associated with the hydraulic fracture (in place of the field conductivity for the cells associated with the fracture).

Provided in some embodiments is a method of developing a hydrocarbon well employing hydraulic fracturing, the method including: determining a geometric signature of a bi-wing hydraulic fracture of a hydrocarbon well having a wellbore extending into a hydrocarbon reservoir, the geometric signature including: a fracture height ($h_f$) corresponding to a height of planar wings associated with the bi-wing hydraulic fracture; a fracture half-length ($X_f$) corresponding to length of each of the planar wings associated with the bi-wing hydraulic fracture; and a fracture width ($w_f$) corresponding to a width of the planar wings associated with the bi-wing hydraulic fracture; determining fracture model parameters for the bi-wing hydraulic fracture, the fracture model parameters including the following modeling parameters for cells of the model that represent a region of the hydrocarbon reservoir that corresponds to the location of the hydraulic fracture: a stimulated cell width ($D_y$) that corresponds to a width of the cells of the model that represent a region of the hydrocarbon reservoir that corresponds to the location of the hydraulic fracture; a stimulated cell length ($D_x$) that corresponds to a length of the cells of the model that represent a region of the hydrocarbon reservoir that corresponds to the location of the hydraulic fracture; and a stimulated cell width (n) that corresponds to a number of cells across a length of the planar wings associated with the bi-wing hydraulic fracture; determining a fracture conductivity diluting factor (FCDF) for the bi-wing hydraulic fracture in accordance with the following relationship:

$$FCDF = \frac{w_f * 2X_f}{n * D_x * D_y}$$

determining a fracture permeability ($K_f$) that corresponds to a permeability associated with stimulated formation rock of the hydrocarbon reservoir; determining a model permeability ($K_{fm}$) for the bi-wing hydraulic fracture in accordance with the following relationship:

$$K_{fm} = FCDF * K_f$$

determining a reservoir model of the reservoir that includes the model permeability ($K_{fm}$) associated with the cells of the reservoir model that represent a region of the hydrocarbon reservoir that corresponds to the location of the hydraulic fracture; and developing, based on the reservoir model, the reservoir.

In some embodiments, the method includes conducting a well logging of the hydrocarbon well to determine a well log for the hydrocarbon well, where the geometric signature of the bi-wing hydraulic fracture is determined based on the well logging of the hydrocarbon well. In certain embodiments, the well logging includes pumping fluids into the wellbore of the hydrocarbon well, the well log for the hydrocarbon well includes a pressure response log that is indicative of variation in pressure in the wellbore over time in response to the pumping of the fluids into the wellbore, and one or more of the fracture half-length ($X_f$), fracture height ($h_f$), fracture width ($w_f$), and the fracture permeability ($K_f$) is determined based on the pressure response log. In some embodiments, the well logging includes a survey of a length of the wellbore of the hydrocarbon well, the well log for the hydrocarbon well is indicative of extents of the hydraulic fracture along the wellbore determined based on the survey of the length of the wellbore of the hydrocarbon well, and the fracture height ($h_f$) is determined based on a distance between the extents of the hydraulic fracture indicated by the well log for the hydrocarbon well. In certain embodiments, developing the reservoir includes conducting a hydraulic fracturing stimulation to generate the hydraulic fracture. In some embodiments, the method includes: generating, based on the reservoir model, a simulation of the reservoir; and determining, based on the simulation of the reservoir, an operating parameter for a given hydrocarbon well extending into the reservoir, where developing the reservoir includes operating the given hydrocarbon well in accordance with the operating parameter. In certain embodiments, the method includes: generating, based on the reservoir model, a simulation of the reservoir; and determining, based on the simulation of the reservoir, a drilling parameter for a given hydrocarbon well extending into the reservoir, where developing the reservoir includes drilling the given hydrocarbon well in accordance with the drilling parameter.

Provided in some embodiments is a hydrocarbon well system for developing a hydrocarbon well employing hydraulic fracturing, the system including: a well control system adapted to perform the following operations: determining a geometric signature of a bi-wing hydraulic fracture of a hydrocarbon well having a wellbore extending into a hydrocarbon reservoir, the geometric signature including: a fracture height ($h_f$) corresponding to a height of planar wings associated with the bi-wing hydraulic fracture; a fracture half-length ($X_f$) corresponding to length of each of the planar wings associated with the bi-wing hydraulic fracture; and a fracture width ($w_f$) corresponding to a width of the planar wings associated with the bi-wing hydraulic fracture; determining fracture model parameters for the bi-wing hydraulic fracture, the fracture model parameters including the following modeling parameters for cells of the model that represent a region of the hydrocarbon reservoir that corresponds to the location of the hydraulic fracture: a stimulated cell width ($D_y$) that corresponds to a width of the cells of the model that represent a region of the hydrocarbon reservoir that corresponds to the location of the hydraulic fracture; a stimulated cell length ($D_x$) that corresponds to a length of the cells of the model that represent a region of the hydrocarbon reservoir that corresponds to the location of the hydraulic fracture; and a stimulated cell width (n) that corresponds to a number of cells across a length of the planar wings associated with the bi-wing hydraulic fracture; determining a fracture conductivity diluting factor (FCDF) for the bi-wing hydraulic fracture in accordance with the following relationship:

$$FCDF = \frac{w_f * 2X_f}{n * D_x * D_y}$$

determining a fracture permeability ($K_f$) that corresponds to a permeability associated with stimulated formation rock of the hydrocarbon reservoir; determining a model permeability ($K_{fm}$) for the bi-wing hydraulic fracture in accordance with the following relationship:

$K_{fm}$=FCDF*$K_f$ determining a reservoir model of the reservoir that includes the model permeability ($K_{fm}$) associated with the cells of the reservoir model that represent a region of the hydrocarbon reservoir that corresponds to the location of the hydraulic fracture; and developing, based on the reservoir model, the reservoir.

In some embodiments, the operations include: conducting a well logging of the hydrocarbon well to determine a well log for the hydrocarbon well, where the geometric signature of the bi-wing hydraulic fracture is determined based on the well logging of the hydrocarbon well. In certain embodiments, the well logging includes pumping fluids into the wellbore of the hydrocarbon well, where the well log for the hydrocarbon well includes a pressure response log that is indicative of variation in pressure in the wellbore over time in response to the pumping of the fluids into the wellbore, and where one or more of the fracture half-length ($X_f$), fracture height ($h_f$), fracture width ($w_f$) and the fracture permeability ($K_f$) is determined based on the pressure response log. In some embodiments, the well logging includes a survey of a length of the wellbore of the hydrocarbon well, where the well log for the hydrocarbon well is indicative of extents of the hydraulic fracture along the wellbore determined based on the survey of the length of the wellbore of the hydrocarbon well, and where the fracture height ($h_f$) is determined based on a distance between the extents of the hydraulic fracture indicated by the well log for the hydrocarbon well. In certain embodiments, developing the reservoir includes controlling a hydraulic fracturing stimulation to generate the hydraulic fracture. In some embodiments, the operations include: generating, based on the reservoir model, a simulation of the reservoir; and determining, based on the simulation of the reservoir, an operating parameter for a given hydrocarbon well extending into the reservoir, where developing the reservoir includes controlling operating of the given hydrocarbon well in accordance with the operating parameter. In certain embodiments, the operations include: generating, based on the reservoir model, a simulation of the reservoir; determining, based on the simulation of the reservoir, a drilling parameter for a given hydrocarbon well extending into the reservoir, where developing the reservoir includes controlling drilling of the given hydrocarbon well in accordance with the drilling parameter.

Provided in some embodiments is a non-transitory computer readable storage medium including program instructions stored thereon that are executable by a processor to perform the following operations for developing a hydrocarbon well employing hydraulic fracturing: determining a geometric signature of a bi-wing hydraulic fracture of a hydrocarbon well having a wellbore extending into a hydrocarbon reservoir, the geometric signature including: a fracture height ($h_f$) corresponding to a height of planar wings associated with the bi-wing hydraulic fracture; a fracture half-length ($X_f$) corresponding to length of each of the planar wings associated with the bi-wing hydraulic fracture; and a fracture width ($w_f$) corresponding to a width of the planar wings associated with the bi-wing hydraulic fracture; determining fracture model parameters for the bi-wing hydraulic fracture, the fracture model parameters including the following modeling parameters for cells of the model that represent a region of the hydrocarbon reservoir that corresponds to the location of the hydraulic fracture: a stimulated cell width ($D_y$) that corresponds to a width of the cells of the model that represent a region of the hydrocarbon reservoir that corresponds to the location of the hydraulic fracture; a stimulated cell length ($D_x$) that corresponds to a length of the cells of the model that represent a region of the hydrocarbon reservoir that corresponds to the location of the hydraulic fracture; and a stimulated cell width (n) that corresponds to a number of cells across a length of the planar wings associated with the bi-wing hydraulic fracture; determining a fracture conductivity diluting factor (FCDF) for the bi-wing hydraulic fracture in accordance with the following relationship:

$$FCDF = \frac{w_f * 2X_f}{n * D_x * D_y}$$

determining a fracture permeability ($K_f$) that corresponds to a permeability associated with stimulated formation rock of the hydrocarbon reservoir; determining a model permeability ($K_{fm}$) for the bi-wing hydraulic fracture in accordance with the following relationship:

$K_{fm}$=FCDF*$K_f$ determining a reservoir model of the reservoir that includes the model permeability ($K_{fm}$) associated with the cells of the reservoir model that represent a region of the hydrocarbon reservoir that corresponds to the location of the hydraulic fracture; and developing, based on the reservoir model, the reservoir.

In some embodiments, the operations include: conducting a well logging of the hydrocarbon well to determine a well log for the hydrocarbon well, where the geometric signature of the bi-wing hydraulic fracture is determined based on the well logging of the hydrocarbon well. In certain embodiments, the well logging includes pumping fluids into the wellbore of the hydrocarbon well, the well log for the hydrocarbon well includes a pressure response log that is indicative of variation in pressure in the wellbore over time in response to the pumping of the fluids into the wellbore, and one or more of the fracture half-length ($X_f$), fracture height ($h_f$), fracture width ($w_f$) and the fracture permeability ($K_f$) is determined based on the pressure response log. In some embodiments, the well logging includes a survey of a length of the wellbore of the hydrocarbon well, the well log for the hydrocarbon well is indicative of extents of the hydraulic fracture along the wellbore determined based on the survey of the length of the wellbore of the hydrocarbon well, and the fracture height ($h_f$) is determined based on a distance between the extents of the hydraulic fracture indicated by the well log for the hydrocarbon well. In certain embodiments, developing the reservoir includes conducting a hydraulic fracturing stimulation to generate the hydraulic fracture. In some embodiments, the operations include: generating, based on the reservoir model, a simulation of the reservoir; determining, based on the simulation of the reservoir, an operating or drilling parameter for a given hydrocarbon well extending into the reservoir, where developing the reservoir includes operating or drilling the given hydrocarbon well in accordance with the operating or drilling parameter.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the scope of the present disclosure as defined by the claims.

DETAILED DESCRIPTION

Described are embodiments of novel systems and method for determining and employing a fracture conductivity diluting factor (FCDF) to provide a computationally efficient and accurate alternative to traditional hydraulic fracture modeling within cell-based modeling of a full-field reservoir model. The FCDF may represents the influence of a hydraulic fracture and may be applied to permeability of cells representing the area of the hydraulic fracture to account for volumetric characteristics of the fracture. This can reduce or eliminate the need for processing intensive simulation techniques for characterizing the fracture and its impact. In some embodiments, a FCDF for hydraulic fracture is based on the volumetric properties and geometry of the fracture itself (e.g., the fracture's width, length and height) and the geometry of the associated modeling of the reservoir (e.g., the size and number of cells corresponding to the location of the fracture), for example, where a well is placed. In the case of a set of cells that are intersected by a fracture and that have a "field" permeability associated therewith, the FCDF for the fracture may be applied to the field permeability of the cells to generate a "model" permeability for the cells. The model permeability may be associated with the cells of a reservoir model that are associated with the fracture, and simulation of the reservoir model may include employing the model permeability for the cells associated with the fracture (in place of the field conductivity for the cells associated with the fracture).

Figure 1:
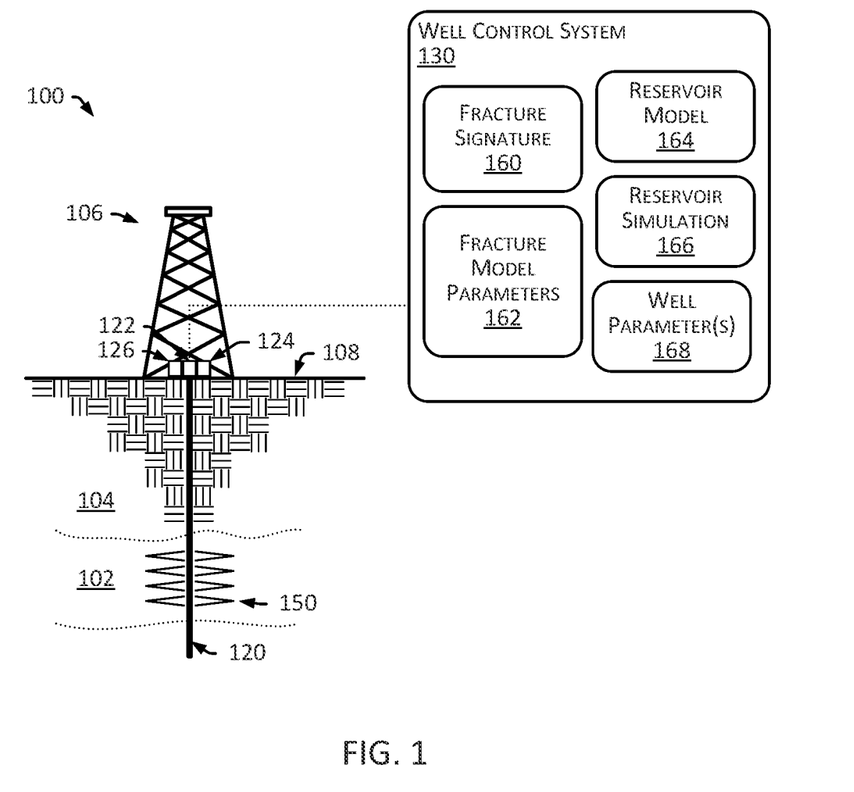
FIG. 1 is diagram that illustrates a well environment in accordance with one or more embodiments.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104, and a well system ("well") 106.

The formation 104 may include a porous or fractured rock formation that resides beneath the earth's surface (or "surface") 108. The reservoir 102 may be a hydrocarbon reservoir defined by a portion of the formation 104 that contains (or that is at least determined or expected to contain) a subsurface pool of hydrocarbons, such as oil and gas. The formation 104 and the reservoir 102 may each include layers of rock having varying characteristics, such as varying degrees of permeability, porosity, and fluid saturation. In the case of the well 106 being operated as a production well, the well 106 may be a hydrocarbon production well that is operable to facilitate the extraction of hydrocarbons (or "production"), such as oil and gas, from the reservoir 102.

The well 106 may include a wellbore 120, a production system 122, a well logging system 124, a well fracturing system 126, and a well control system ("control system") 130. The wellbore 120 may be, for example, a bored hole that extends from the surface 108 into a target zone of the formation 104, such as the reservoir 102. The wellbore 120 may be created, for example, by a drill bit of a drilling system of the well 106 boring through the formation 104 and the reservoir 102. An upper end of the wellbore 120 (e.g., located at or near the surface 108) may be referred to as the "up-hole" end of the wellbore 120. A lower end of the wellbore 120 (e.g., terminating in the formation 104) may be referred to as the "down-hole" end of the wellbore 120.

In some embodiments, the production system 122 includes production devices that facilitate the extraction of production from the reservoir 102 by way of the wellbore 120. For example, the production system 122 may include valves, pipes, pumps and sensors that are operable to regulate the pressure and flowrate of production from the wellbore 120 and to monitor production parameters, such as production flowrate, flowing pressure and temperature in the wellbore 120. In some embodiments, the control system 130 (or another operator of the well 106) controls operation of some or all of the aspects of the production system 122.

In some embodiments, the well logging system 124 includes logging devices that facilitate assessment of the wellbore 120 and the surrounding formation rock. For example, the well logging system 124 may include one or more well logging tools having sensors that are operable to sense conditions of the formation rock surrounding the wellbore 120. During a well logging operation, a logging tool may be lowered into the wellbore 120 and be operated to sense a given characteristic of the formation rock surrounding the wellbore 120 as the tool moves along the length of the wellbore 120. A corresponding well log may be generated that provides a mapping of the characteristic (or other characteristics determined therefrom) versus depth in the wellbore. In some embodiments, the control system 130 (or another operator of the well 106) controls operation of some or all of the aspects of the well logging system 124.

In some embodiments, the logging system 124 includes an acoustic imaging logging tool that is operable to sense properties for estimating the location and extent (e.g., height and width) of a hydraulic fracture 150 in the wall of the wellbore 120. In some embodiments, the data acquired from the acoustic imaging logging tool is used to generate an acoustic image log for the well 106, and the acoustic image log is used to estimate the location and extent (e.g., height and width) of the hydraulic fracture 150 in the wall of the wellbore 120. In some embodiments, the logging system 124 includes a temperature logging tool that is operable to sense the temperature of formation rock forming the wall of the wellbore 120. In some embodiments, the data acquired from the temperature logging tool is used to generate a temperature log for the well 106, and the temperature log for the well 106 is used to determine the location and extent (e.g., height and width) of the hydraulic fracture 150 in the wall of the wellbore 120. In some embodiments, the well logging system 124 includes a pressure logging system that is operable to sense the variations in fluid pressure in the wellbore 120 (e.g., in response to the pumping of the fluids into the wellbore 120). In some embodiment, pressure data indicative of the variations may be used to generate a pressure response log for the well 106 that is indicative of the pressure variations over time, and the pressure response log for the well 106 is used to determine the half-length and width of the hydraulic fracture 150 extending into the formation 104. In some embodiments, the logging system 124 includes a nuclear magnetic resonance (NMR) logging tool that is operable to sense the induced magnet moment of hydrogen nuclei (protons) contained within the fluid-filled pore space of the formation rock surrounding the wellbore 120. In some embodiments, the data acquired from the NMR logging tool is used to generate a NMR log for the well 106, and the NMR well log for the well 106 is used to determine a permeability log that provides an indication of permeability of the formation rock along the length of the wellbore 120 vs depth. In some embodiments, the permeability log is used to determine permeability ("field permeability") that is associated with the formation rock located at or near the wellbore 120. In some embodiments, a permeability log is determined based laboratory assessment of core-samples extracted from the wellbore 120.

In some embodiments, the well fracturing system 126 includes fracturing devices that facilitate fracturing of the formation rock surrounding the wellbore 120. For example, the well fracturing system 126 may include valves, pumps, conduits and sensors that facilitate high-pressure injection of fracking fluid (e.g., water containing sand or other proppants) into the wellbore 120 to create fractures in the formation rock surrounding the wellbore 120. The well fracturing system 126 may, for example, be operable to generate the fracture 150, which extend radially from the wellbore 120, into the formation rock of the formation 104. In some embodiments, the control system 130 (or another operator of the well 106) controls operation of some or all of the aspects of the well fracturing system 126.

In some embodiments, the well control system 130 is operable to control various operations of the well 106, such as well drilling operations, well completion operations, well production operations, or well or formation remediation operations. The well control system 130 may include a well system memory and a well system processor that are capable of performing the various processing and control operations of the well control system 130 described here. In some embodiments, the well control system 130 includes a computer system that is the same as or similar to that of computer system 1000 described with regard to at least FIG. 5.

In some embodiments, the well control system 130 is operable to determine and employ a fracture conductivity diluting factor (FCDF) in cell-based modeling and simulation of the reservoir 102. This may include, for example, the well control system 130 performing the following operations: (1) determining/generating a hydraulic fracture 150 of the wellbore 102 of the well 106; (2) determining a geometric signature (or "fracture signature") 160 of the hydraulic fracture 150, including: (a) a fracture height ($h_f$) corresponding to a height of planar wings of the hydraulic fracture 150; (b) a fracture half-length ($X_f$) corresponding to a length of each of the planar wings of the hydraulic fracture 150; and (c) a fracture width ($w_f$) corresponding to a width of the planar wings of the hydraulic fracture 150; (2) determining fracture model parameters 162 for the hydraulic fracture 150, including the following: (a) a stimulated cell width ($D_y$) that corresponds to a width of the cells of a reservoir model ("model") 164 that represent a volume that corresponds to the location of the hydraulic fracture 150 (e.g., cells of the model 164 that are intersected by at least a portion of the hydraulic fracture 150); (b) a stimulated cell length ($D_x$) that corresponds to a length of the cells of the model 164 that represent a volume that corresponds to the location of the hydraulic fracture 150; and a stimulated cell width (n) that corresponds to a number of cells of the model 164 that represent a volume along the length of the planar wings of the hydraulic fracture 150; (3) determining a FCDF for the hydraulic fracture 150 based on the fracture signature 160; (4) determining a field permeability ($K_f$) that corresponds to a permeability associated with formation rock of the hydrocarbon reservoir at or near the location of the wellbore 120 and the fracture 150; (5) determining a model fracture permeability ($K_{fm}$) for cells of the reservoir model 164 that represent a volume that corresponds to the location of the hydraulic fracture 150 based on a product of the FCDF and the field permeability ($K_f$); (6) associating the model fracture permeability ($K_{fm}$) with the cells of the reservoir model 164 that represent a volume that corresponds to the location of the hydraulic fracture 150. This may generate a reservoir model 164 that includes the cells corresponding to the location of the hydraulic fracture 150 having a model fracture permeability ($K_{fm}$) that can be used as the permeability of the cell during simulation of the model 164, in place of the field permeability ($K_f$). In some embodiments, the reservoir 102 is developed based on the "updated" reservoir model 164, which includes the model fracture permeability ($K_{fm}$) for the cells corresponding to the location of the hydraulic fracture 150. For example, a reservoir simulation operation may be conducted using the updated reservoir model 164 (including the model fracture permeability ($K_{fm}$) associated with the cells corresponding to the location of the hydraulic fracture 150) to generate a simulation of the reservoir 102 ("reservoir simulation") 166 that provides predictions of the location and movement of fluids (e.g., oil, gas and water) within the reservoir 102 over time, the simulation 166 may be used to determine well parameters 168 (e.g., drilling, completion or production parameters) for the well 106 (or other wells in the reservoir 102), and the well 106 (or other wells in the reservoir 102) may be operated (e.g., drilled, completed, or produced) in accordance with the well parameters 168.

Figure 2A:
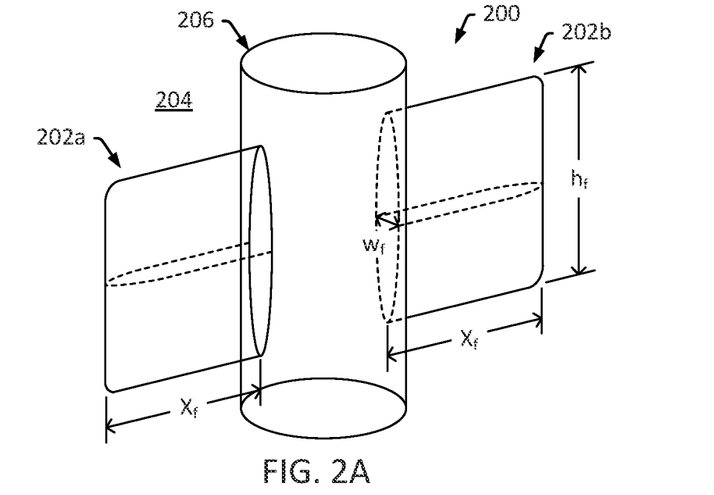
FIGS. 2A-2D are diagrams that illustrate an example fracture geometry in accordance with one or more embodiments.
Figure 2B:
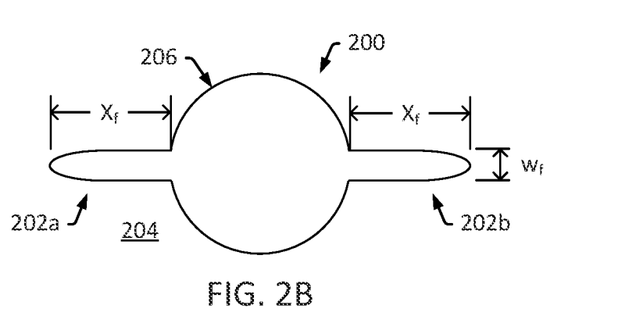
Figure 2C:
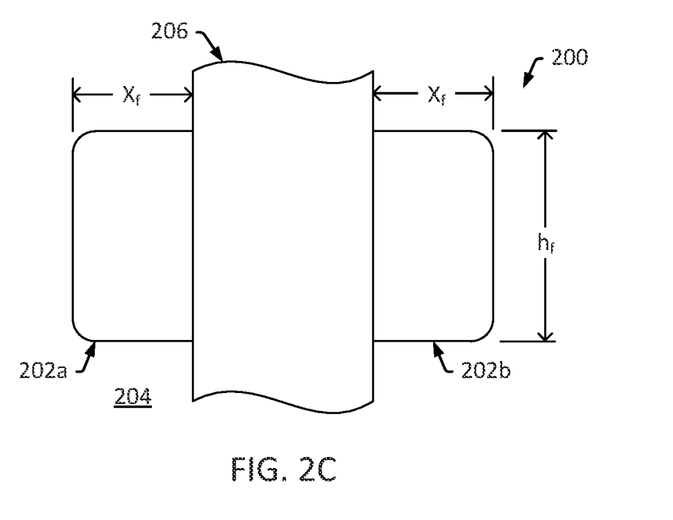
Figure 2D:
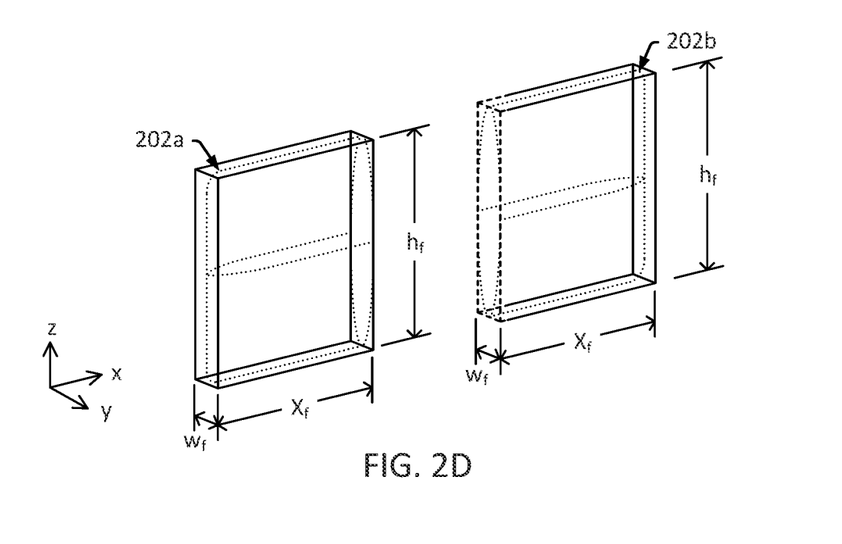

Hydraulic fractures generally propagate in a given direction based on the stress directions and weakness (e.g., rock properties) within a formation. Hydraulic fractures typically propagate at opposite sides of a wellbore, creating what are often referred to as two "wings" or "bi-wings." FIGS. 2A-2C are diagrams that illustrate perspective, top and side views, respectively, of a geometric representation of a bi-wing hydraulic fracture (e.g., fracture 150) in accordance with one or more embodiments. The representation includes a fracture geometry 200 having two fractures wings 202 that extend laterally, in opposite directions into formation rock 204 (e.g., formation 104) from a wellbore 206 (e.g., wellbore 102). The wings 202 have a fracture height ($h_f$), a fracture half-length ($X_f$), and a fracture width ($w_f$). As illustrated in FIG. 2D, each of the wings 202 may be represented by a rectangular prism of the given fracture height ($h_f$), fracture half-length ($X_f$) and fracture width ($w_f$). The fracture height ($h_f$), the fracture half-length ($X_f$) (or length, $2*X_f$), and the fracture width ($w_f$) may define the geometric signature (or "fracture signature") of the hydraulic fracture.

In some embodiments, a total fracture capacity ($TFC_{field}$) of both wings is determined based on a "field" or "fracture" permeability ($K_f$) for the formation rock into which the fracture extends, and the fracture signature. For example, a total field fracture capacity ($TFC_{field}$) for both wings of a bi-wing hydraulic fracture may be determined according to the following equation:

$$TFC_{field} = K_f * w_f * 2X_f * h_f \quad (1)$$

The fracture height ($h_f$), the fracture half-length ($X_f$), and the fracture width ($w_f$) may be in units of length (e.g., feet (ft) or meters (m)), and the field permeability may be in units of millidarcy (mD).

A cell-based model of a reservoir (e.g., reservoir model 164) is typically comprised of cells that each represent respective cellular volumes, and that, together, represent a larger volume, such as some or all of a hydrocarbon reservoir (e.g., reservoir 102). Each of the cells is typically associated with an initial set of characteristics, such as a permeability, a porosity, an oil saturation and a water saturation, for the associated portion of the reservoir represented by the cell. For example, a cell may be associated with a permeability, a porosity and a water saturation determined for the formation rock contained within the region represented by the cell (e.g., by way of logging operations, such as those described here). Consistent with this approach, where a formation is subjected to stimulation, such as hydraulic fracturing, (whether it be actual or simulated stimulation), characteristics of some or all the cells involved may be modified to reflect the impact of the stimulation. For example, if it is determined that a stimulation operation creates a fracture that extends across a given region, the permeability of cells that represent volumes intersected by the region may be modified to reflect the impact of the fracture. As described here, this may include determining a model permeability for each of the cells that is a product of a field permeability for each of the cells and a FCDF determined based on the geometry and volumetric characteristics of the fracture.

Figure 3:
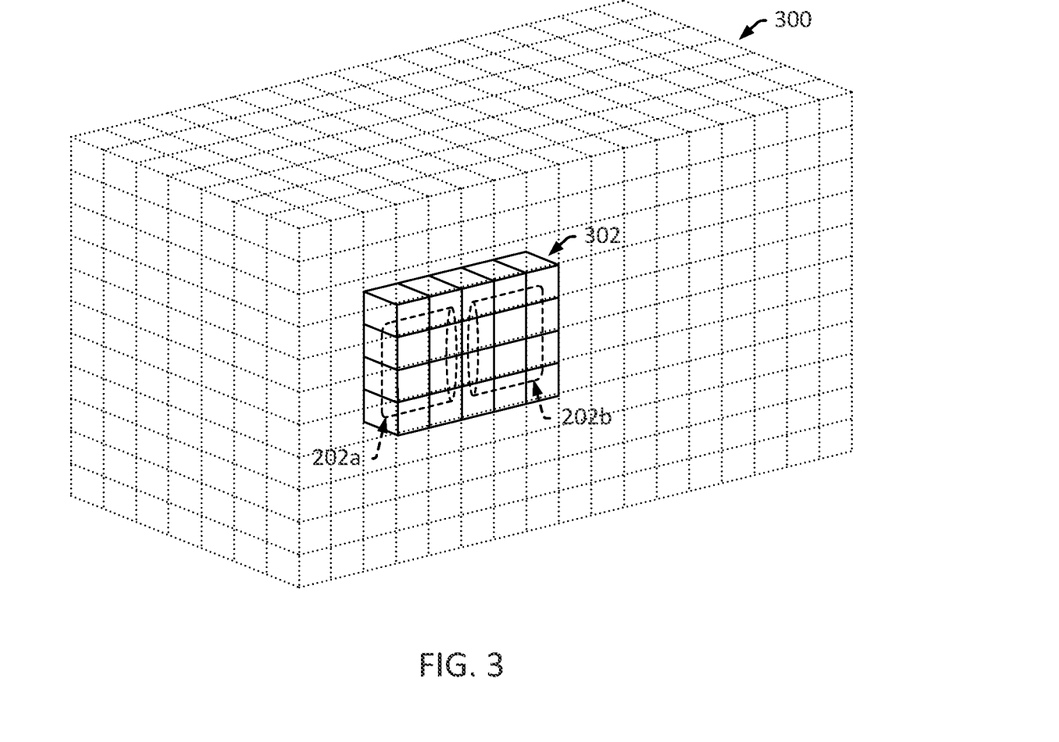
FIG. 3 is a diagram that illustrates an example fracture modeling in accordance with one or more embodiments.

FIG. 3 is a diagram that illustrates an example fracture modeling of a "two-wing" (or "bi-wing") hydraulic fracture (e.g., fracture 150) (applied in a 3D cell based model) in accordance with one or more embodiments. In the illustrated embodiment, the modeling includes a cell region 300 and a sub-region 302 located within the cell region 300. The cell region 300 may be defined by a grid cells of a reservoir model (e.g., reservoir model 104) that represent some or all of a reservoir (e.g., reservoir 102) being modeled, and the sub-region 302 be defined by a sub-set of cells of the region 300 that represent volumes that correspond to the location of the wings 202a and 202b of the hydraulic fracture. For example, in the illustrated embodiment, the region 300 is defined by a 7-cell×11-cell×17-cell region that corresponds to a portion of a reservoir (e.g., reservoir 102) that contains the first and second wings 202a and 202b, and the sub-region 302 is defined by a 1-cell×4-cell×5-cell region that is defined by a sub-set of the cells that each correspond to a portion of the reservoir that is intersected by the first and second wings 202a and 202b. Accordingly, in some embodiments, the fracture modeling of a "two-wing" (or "bi-wing") hydraulic fracture may include a "wing" sub-region that is defined by cells intersected by the wings of the hydraulic fracture.

The modeling of a "two-wing" (or "bi-wing") hydraulic fracture (e.g., fracture 150) may be associated with fracture model parameters 162 that are defined by the cells representing the fracture. For example, fracture model parameters 162 may be defined by permeability characteristics and geometric aspects of the wing sub-region associated with the fracture. This may include the permeability associated with the cells of the region, as well as a number of cells "stimulated" in a lateral direction (n), the length of cells in the lateral direction ($D_x$), the width of cells in the direction of width ($D_y$), and the height of the region ($h_{fm}$). Referring to FIG. 3, for example, the number of cells "stimulated" in a lateral direction (n) may be 5 cells (which accounts for the total length of both wings of the fracture), the length of cells in the lateral direction ($D_x$) may be defined by a distance in the "x-direction" represented by the cells in the model, and the width of cells in the direction of width ($D_y$) may be defined by a distance in the "y-direction" represented by the cells in the model, and the height of the region ($h_{fm}$) may be defined by the length of the fracture in the "z-direction" represented by the cells of the wings (e.g., the eight cell height is equivalent to a height of 800 m where each cell represents a region having a height of 100 m).

In some embodiments, a fracture conductivity diluting factor (FCDF) is determined and employed within cell-based modeling of a full-field reservoir model to provide modeling of hydraulic fracture characteristics. The FCDF for a hydraulic fracture may be applied to "field" values of permeability for cells in the area of the fracture to account for volumetric characteristics of the fracture and its impact. For example, referring to FIG. 3, a FCDF determined for the modeling may be applied to the permeability values associated with the 20 cells of the "wing" sub-region 302 to generate modified permeability values for those cells, which can be employed to account for volumetric characteristics of the fracture.

In some embodiments, a "model" total fracture capacity ($TFC_{model}$) of a fracture modeling of a "two-wing" (or "bi-wing") hydraulic fracture is determined based on a "model" permeability ($K_f$) for the associated cells and their geometry. For example, a model total fracture capacity ($TFC_{model}$) for the two wings of a bi-wing hydraulic fracture may be determined according to the following equation:

$$TFC_{Model} = K_{fm} * n * D_x * D_y \quad (2)$$

In some embodiments, a FCDF for cells of a full scale reservoir model that are associated with a hydraulic fracture is based on the geometry of the fracture itself (e.g., the fracture's width, length and height) and the geometry of the associated modeling of the reservoir (e.g., the size and number of cells corresponding to the location of the fracture). In the case of a set of cells that are intersected by a fracture and that have a "field" permeability associated therewith, the FCDF for the fracture may be applied to the field permeability of the cells to generate a "model" permeability for the cells. The model permeability may be associated with the cells of a reservoir model that are associated with the fracture, and simulation of the reservoir model may include employing the model permeability for the cells associated with the fracture (in place of the field permeability for the cells associated with the fracture).

In some embodiments, a FCDF for a "two-wing" (or "bi-wing") hydraulic fracture is arrived at based on the following, which assumes that the actual total fracture capacity of a fracture ("field total fracture capacity" or "$TFC_{field}$") is equal to the modeled total fracture capacity of the fracture ("modeled total fracture capacity" or "$TFC_{model}$") The "model" total fracture capacity ($TFC_{model}$) of a bi-wing hydraulic fracture (including both wings of the fracture) can be determined according to the following:

Assuming the following:

$$TFC_{field} = TFC_{Model}, \quad (3)$$

then $$K_f * w_f * 2X_f * h_f = K_{fm} * n * D_x * D_y * h_{fm}, \quad (4)$$

and $$K_{fm} = \frac{w_f * 2X_f * h_f * K_f}{n * D_x * D_y * h_{fm}}. \quad (5)$$

Assuming the following:

$$h_f = h_{fm} \quad (6)$$

then:

$$K_{fm} = \frac{w_f * 2X_f * K_f}{n * D_x * D_y}, \quad (7)$$

and the FCDF may be defined as follows:

$$FCDF = \frac{w_f * 2X_f}{n * D_x * D_y}. \quad (8)$$

Accordingly, $$K_{fm} = FCDF * K \quad (9)$$

In such an embodiment, a model permeability ($K_{fm}$) for a cell associated with the fracture can be determined by multiplying a permeability (e.g., a field permeability) determined for the cell by the FCDF. For example, referring to FIG. 3, if each of the 20 cells of the "wing" sub-region 302 is associated with an estimated fracture permeability ($K_f$) of 357700 mD, and the FCDF is determined to be $2.65 \times 10^{-5}$, then a model permeability ($K_{fm}$) of 9.5 mD may be determined and associated with each of the 20 cells.

Figure 4:
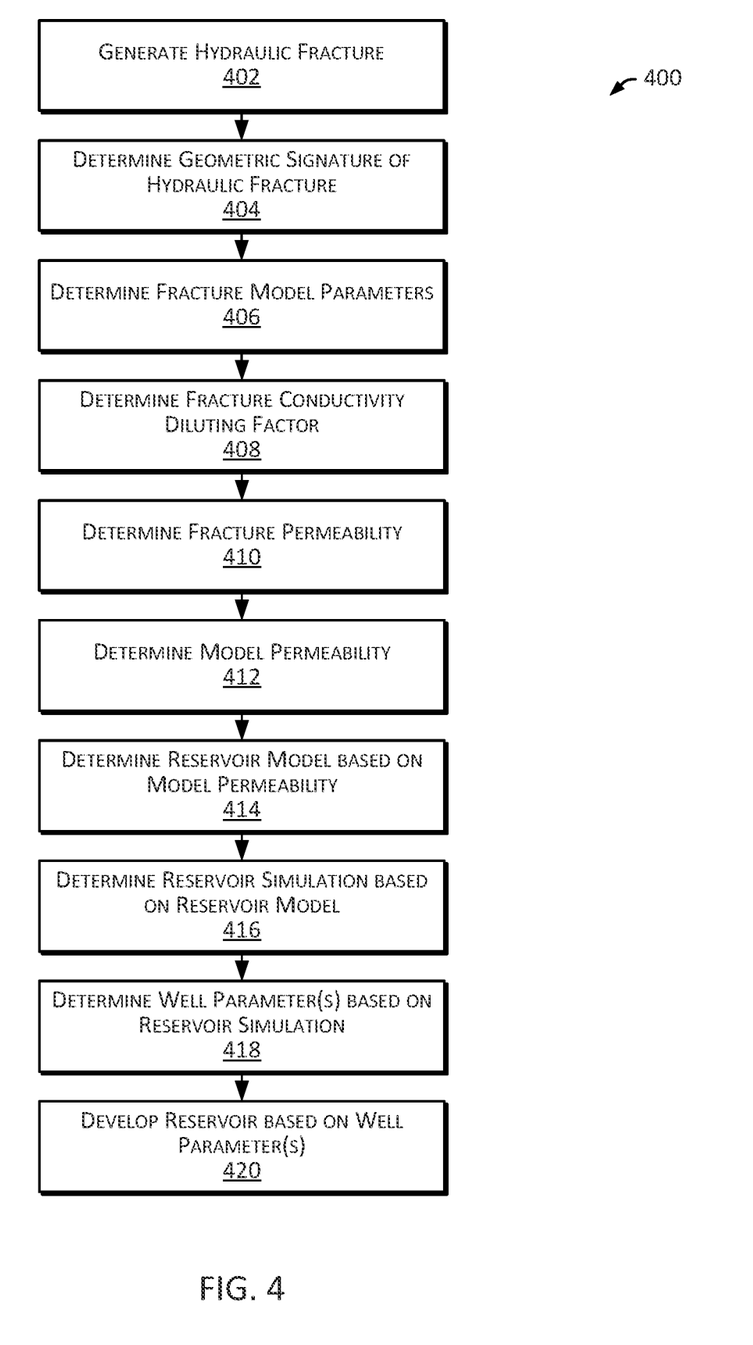
FIG. 4 is a flowchart that illustrates a method of modeling and developing a reservoir in accordance with one or more embodiments.

FIG. 4 is a flowchart that illustrates a method 400 of determining a fracture conductivity diluting factor (FCDF) and developing a reservoir in accordance with one or more embodiments. In the context of the well 106, some or all of the operations of method 400 may be performed by the well control system 130 (or another operator of the well 106).

In some embodiments, method 400 includes generating a hydraulic fracture (block 402). This may include generating a "two-wing" (or "bi-wing") hydraulic fracture that extends from the wellbore of a well into formation rock of a surrounding hydrocarbon reservoir. For example, generating a hydraulic fracture may include the well control system 130 (or another operator of the well 106) controlling the well fracturing system 126 to cause high-pressure injection of fracking fluid (e.g., water containing sand or other proppants) into the wellbore 120 to create the fracture 150 in the formation rock surrounding the wellbore 120. In some embodiments, generating a hydraulic fracture includes determining/generating a simulated hydraulic fracture. For example, the well control system 130 may determine/generate a simulated hydraulic fracture having a geometric signature determined based on a set of hydraulic fracturing parameters. This may be useful for predicting the impact of a hydraulic fracturing on development of the reservoir before the fracturing operation is actually undertaken.

In some embodiments, method 400 includes determining a geometric signature of the hydraulic fracture (block 404). This may include determining a fracture height, width, half-length associated with the hydraulic fracture. Continuing with the prior example, this may include the well control system 130 (or another operator of the well 106) identifying a geometric signature ("fracture signature") 160 of the hydraulic fracture 150, including: (a) a fracture height ($h_f$) of 330 ft (91.4 m) corresponding to a height (in z-direction) of planar wings associated with the hydraulic fracture 150; (b) a fracture half-length ($X_f$) of 713 ft (217 m) corresponding to length (in the x-direction) of each of the planar wings associated with the hydraulic fracture 150; and (c) a fracture width ($w_f$) of 0.01 ft (0.003 m) corresponding to a width (in the y-direction) of the planar wings associated with the hydraulic fracture 150. The fracture height ($h_f$) may be determined, for example, based on logging of the wellbore 120, such as that describe here. For example, the well control system 130 (or another operator of the well 106) may control the logging system 124 to conduct acoustic imaging logging or temperature logging of the wellbore 120 to generate an acoustic image log or a temperature log, and the well control system 130 may determine, based on the log(s), the fracture height ($h_f$) of the fracture 150 (e.g., based on the upper and lower extents of the fracture 150 indicated by the log(s)). The fracture half-length ($X_f$) and width ($w_f$) may be determined, for example, based on pressure response for the well 106 during pumping operations. For example, the well control system 130 (or another operator of the well 106) may control the logging system 124 to pump fluids into the wellbore 120 of the well 106 and generate a pressure response for the well 106, and the well control system 130 may determine, based on the pressure response, the fracture half-length ($X_f$) and width ($w_f$) for the fracture 150.

In some embodiments, method 400 includes determining fracture model parameters for the hydraulic fracture (block 406). This may include determining a stimulated cell width ($D_y$) that corresponds to a width (in the y-direction) of cells of a model of the reservoir that represent a region/volume that corresponds to the location of the hydraulic fracture, a stimulated cell length ($D_x$) that corresponds to a length (in the x-direction) of cells of a model of the reservoir that represent a region/volume that corresponds to the location of the hydraulic fracture, and a stimulated cell width (n) that corresponds to a number of cells (in the x-direction) across the length of the planar wings associated with the hydraulic fracture. Continuing with the prior example, where the cells of the model have a size of about 328 ft×328 ft×100 ft (100 m×100 m×30 m), this may include the well control system 130 (or another operator of the well 106) determining a stimulated cell width ($D_y$) of 328 feet (100 m), a stimulated cell length ($D_x$) of 328 feet (100 m), and a stimulated cell width (n) of 5 cells (e.g., 713 ft×2/328 ft/cell=4.35 cells, which is rounded up to 5 cells—the next whole number of cells).

In some embodiments, method 400 includes determining a fracture conductivity diluting factor (FCDF) (block 408). This may include determining a fracture conductivity diluting factor (FCDF) in accordance with equation 8. Continuing with the prior example, this may include the well control system 130 (or another operator of the well 106) determining a fracture conductivity diluting factor (FCDF) of 0.0000265 ($2.65 \times 10^{-5}$) based on application of the fracture half-length ($X_f$) of 713 feet (217 m), the fracture width ($w_f$) of 0.01 ft (0.003 m), the stimulated cell width ($D_y$) of 328 feet (100 m), the stimulated cell length ($D_x$) of 328 feet (100 m), and the stimulated cell width (n) of 5 cells, to equation 8.

In some embodiments, method 400 includes determining a fracture permeability (block 410). This may include determining a fracture permeability ($K_f$) that corresponds to a permeability associated with formation rock of the hydrocarbon reservoir in the location of the hydraulic fracture. Continuing with the prior example, this may include the well control system 130 (or another operator of the well 106), for each of the cells of the sub-region 302, determining a permeability of the corresponding portion of the formation represented by the cell. Where the 20 cells of the sub-region 302 are determined to have an "stimulated" permeability of 357700 mD, this may include, for example, the well control system 130 associating each of the 20 cells of the sub-region 302 with a "fracture" permeability (Pf) of 357700 mD. Where the portion of the formation represented by the cells of the region 300 have an "stimulated" permeability of 357700 mD, this may include, for example, the well control system 130 associating each of the cells of the region 300 with a "fracture" permeability (Pf) of 357700 mD. The "stimulated" permeability may be determined, for example, based on a pressure response log for the well 106.

In some embodiments, method 400 includes determining a model permeability (block 412). This may include determining, for each of the cells associated with the hydraulic fracture, a model permeability ($K_{fm}$) that corresponds to a product of the FCDF and a field permeability (Km) associated with the cell, in accordance with equation 9. Continuing with the prior example, this may include the well control system 130 (or another operator of the well 106), for each of the cells of the sub-region 302, determining a model permeability for the cell by multiplying the fracture permeability ($K_f$) of 357700 mD associated with the cell by the FCDF ($2.65 \times 10^{-5}$) associated with the fracture 150, to determine a model permeability ($K_{fm}$) of 9.5 mD for each of the cells of the sub-region 302.

In some embodiments, method 400 includes determining a reservoir model based on the model permeability (block 414). This may include determining a reservoir model having model permeabilities associated with corresponding cells of the reservoir model (e.g., for use in place of the formation and fracture permeability). Continuing with the prior example, this may include the well control system 130 (or another operator of the well 106) generating a reservoir model 164 for the reservoir 102 having the model permeability ($K_{fm}$) of 9.5 mD associated with each of the cells of the sub-region 302, and having the fracture permeability ($K_f$) of 357700 mD associated with each of the other cells of the region 300.

In some embodiments, method 400 includes determining a reservoir simulation based on the reservoir model (block 416). This may include conducting a simulation of the reservoir based on the "updated" reservoir model, including using the model permeability ($K_{fm}$) as the permeability of the cells corresponding to the hydraulic fracture (e.g., in place of the field permeability). Continuing with the prior example, this may include the well control system 130 (or another operator of the well 106) conducing a reservoir simulation using the reservoir model 164 for the reservoir 102, including employing a set of operational parameters (e.g., production flow rates and pressures) for the well 106 (or other wells in the reservoir 102), and employing the model permeability ($K_{fm}$) of 9.5 mD as the permeability for each of the cells of the sub-region 302 and employing the fracture permeability ($K_f$) of 357700 mD as the permeability for each of the other cells of the region 300, to generate a simulation that provides an indication of predicted movement of fluids within the reservoir 102 over time, responsive to the well 106 (or other wells in the reservoir 102) operating in accordance with the operational parameters.

In some embodiments, method 400 includes determining well parameters based on the simulation of the reservoir model (block 418). This may include determining a set of well parameters based on the outcome of a simulation. Continuing with the prior example, this may include the well control system 130 (or another operator of the well 106) determining that the outcome of the simulation is desirable, and, in response, determining a set of well parameters 168 (e.g., production flowrate and pressure) for the well 106 (or the other wells in the reservoir 102) that correspond to the set of operational parameters of the simulation.

In some embodiments, method 400 includes developing the reservoir based on the well parameters (block 420). This may include drilling or operating one or more wells of the reservoir in accordance with the well parameters. Continuing with the prior example, this may include the well control system 130 (or another operator of the well 106) controlling the production system 122 of the well 106 (or production systems of other wells in the reservoir 102) to operate in accordance with the set of operating parameters that correspond to the set of operational parameters of the simulation (e.g., controlling the well 106 to operate at the production flowrate and pressure of the well parameters 168). In some embodiments, the well parameters may include drilling or hydraulic fracturing parameters for one or more wells of the reservoir, and developing the reservoir based on the well parameters may include the well control system 130 (or another operator of the well 106) controlling a drilling system to drill the well 106 (or other wells in the reservoir 102) in accordance with the drilling parameters of the well parameters 168, or controlling the well fracturing system 126 of the well 106 (or other wells of the reservoir 102) to fracture the well 106 (or other wells in the reservoir 102) in accordance with the stimulation parameters.

Figure 5:
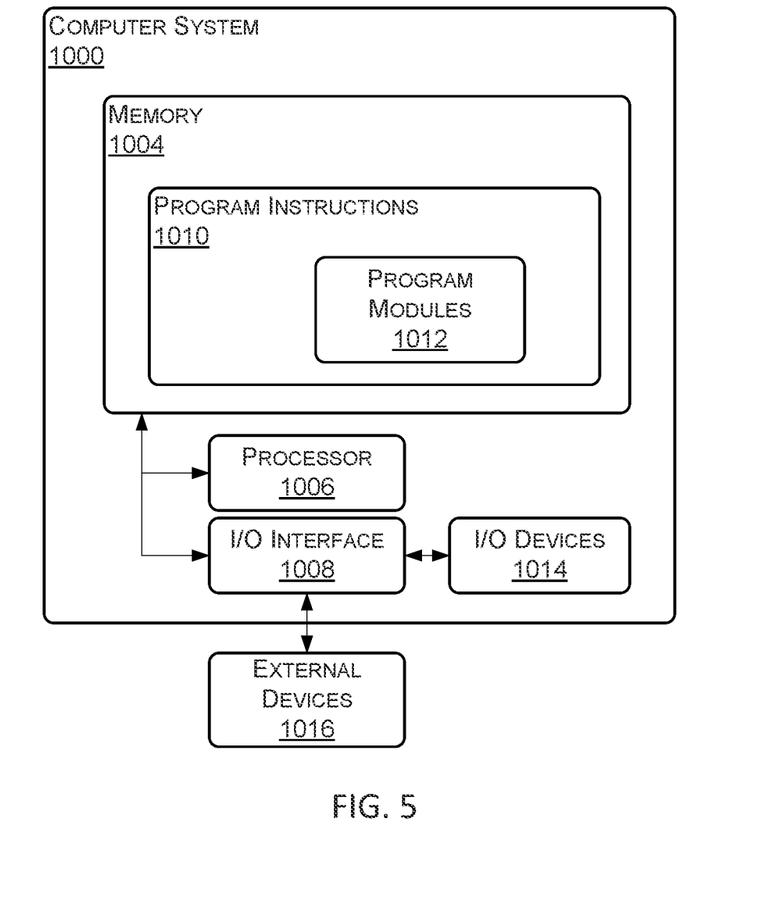
FIG. 5 is a diagram that illustrates an example computer system in accordance with one or more embodiments.

FIG. 5 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having program instructions 1010 stored thereon. The program instructions 1010 may include program modules 1012 that are executable by a computer processor (for example, the processor 1006) to cause the functional operations described, such as those described with regard to the well control system 130 (or another operator of the well 106), or the method 400.

The processor 1006 may be any suitable processor capable of executing program instructions. The processor 1006 may include a central processing unit (CPU) that carries out program instructions (for example, the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (for example, an Industrial Ethernet connection) or a wireless connection (for example, a Wi-Fi connection). The I/O interface 1008 may provide an interface for communication with one or more external devices 1016. In some embodiments, the I/O interface 1008 includes one or both of an antenna and a transceiver. The external devices 1016 may include, for example, devices of the production system 122, the well logging system 124, or the well fracturing system 126.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (that is, meaning having the potential to), rather than the mandatory sense (that is, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of developing a hydrocarbon well employing hydraulic fracturing, the method comprising:
   conducting a well logging of the hydrocarbon well to determine a well log for the hydrocarbon well, wherein the well logging comprises pumping fluids into a wellbore of the hydrocarbon well;
   determining a geometric signature of a bi-wing hydraulic fracture of the hydrocarbon well having the wellbore extending into a hydrocarbon reservoir, wherein the geometric signature of the bi-wing hydraulic fracture is determined based on the well logging of the hydrocarbon well, the geometric signature comprising:
      a fracture height ($h_f$) corresponding to a height of planar wings associated with the bi-wing hydraulic fracture;
      a fracture half-length ($X_f$) corresponding to a length of each of the planar wings associated with the bi-wing hydraulic fracture; and
      a fracture width ($w_f$) corresponding to a width of the planar wings associated with the bi-wing hydraulic fracture;
   determining fracture model parameters for the bi-wing hydraulic fracture, the fracture model parameters comprising the following modeling parameters for cells of a model that represents a region of the hydrocarbon reservoir that corresponds to a location of the bi-wing hydraulic fracture:
      a stimulated cell width ($D_y$) that corresponds to a width of the cells of the model that represents the region of the hydrocarbon reservoir that corresponds to the location of the bi-wing hydraulic fracture;
      a stimulated cell length (Dr) that corresponds to a length of the cells of the model that represents the region of the hydrocarbon reservoir that corresponds to the location of the bi-wing hydraulic fracture; and a stimulated cell width (n) that corresponds to a number of the cells across a length of the planar wings associated with the bi-wing hydraulic fracture;

determining a fracture conductivity diluting factor (FCDF) for the bi-wing hydraulic fracture in accordance with the following relationship:

$$FCDF = \frac{w_f * 2X_f}{n * D_x * D_y}$$

determining a fracture permeability ($K_f$) that corresponds to a permeability associated with stimulated formation rock of the hydrocarbon reservoir;

determining a model permeability ($K_{fm}$) for the bi-wing hydraulic fracture in accordance with the following relationship:

$$K_{fm} = FCDF * K_f$$

determining a reservoir model of the hydrocarbon reservoir that comprises the model permeability ($K_{fm}$) associated with the cells of the reservoir model that represent the region of the hydrocarbon reservoir that corresponds to the location of the bi-wing hydraulic fracture;

developing, based on the reservoir model, the hydrocarbon reservoir, wherein the developing the hydrocarbon reservoir comprises conducting a hydraulic fracturing stimulation to generate the bi-wing hydraulic fracture, the hydraulic fracturing stimulation comprising injecting a fracking fluid in the region of the hydrocarbon reservoir that corresponds to the location of the bi-wing hydraulic fracture;

generating, based on the reservoir model, a simulation of the hydrocarbon reservoir; and determining, based on the simulation of the hydrocarbon reservoir, an operating parameter for a given hydrocarbon well extending into the hydrocarbon reservoir, wherein developing the hydrocarbon reservoir comprises operating the given hydrocarbon well in accordance with the operating parameter.

2. The method of claim 1, wherein the well log for the hydrocarbon well comprises a pressure response log that is indicative of variation in pressure in the wellbore over time in response to the pumping of the fluids into the wellbore, and wherein one or more of the fracture half-length ($X_f$), the fracture height ($h_f$), the fracture width ($w_f$), and the fracture permeability ($K_f$) is determined based on the pressure response log.

3. The method of claim 1, wherein the well logging comprises a survey of a length of the wellbore of the hydrocarbon well, wherein the well log for the hydrocarbon well is indicative of extents of the bi-wing hydraulic fracture along the wellbore determined based on the survey of the length of the wellbore of the hydrocarbon well, and wherein the fracture height ($h_f$) is determined based on a distance between the extents of the bi-wing hydraulic fracture indicated by the well log for the hydrocarbon well.

4. The method of claim 1, further comprising:

generating, based on the reservoir model, the simulation of the hydrocarbon reservoir; and determining, based on the simulation of the hydrocarbon reservoir, a drilling parameter for the given hydrocarbon well extending into the hydrocarbon reservoir, wherein developing the hydrocarbon reservoir comprises drilling the given hydrocarbon well in accordance with the drilling parameter.

5. A hydrocarbon well system for developing a hydrocarbon well employing hydraulic fracturing, the system comprising:

a well control system comprising a processor and memory configured to perform the following operations:

conducting a well logging of the hydrocarbon well to determine a well log for the hydrocarbon well, wherein the well logging comprises pumping fluids into a wellbore of the hydrocarbon well;

determining a geometric signature of a bi-wing hydraulic fracture of the hydrocarbon well having the wellbore extending into a hydrocarbon reservoir, wherein the geometric signature of the bi-wing hydraulic fracture is determined based on the well logging of the hydrocarbon well, the geometric signature comprising:

a fracture height ($h_f$) corresponding to a height of planar wings associated with the bi-wing hydraulic fracture;

a fracture half-length ($X_f$) corresponding to a length of each of the planar wings associated with the bi-wing hydraulic fracture; and a fracture width ($w_f$) corresponding to a width of the planar wings associated with the bi-wing hydraulic fracture;

determining fracture model parameters for the bi-wing hydraulic fracture, the fracture model parameters comprising the following modeling parameters for cells of a model that represents a region of the hydrocarbon reservoir that corresponds to a location of the bi-wing hydraulic fracture:

a stimulated cell width ($D_y$) that corresponds to a width of the cells of the model that represents the region of the hydrocarbon reservoir that corresponds to the location of the bi-wing hydraulic fracture;

a stimulated cell length (Dr) that corresponds to a length of the cells of the model that represents the region of the hydrocarbon reservoir that corresponds to the location of the bi-wing hydraulic fracture; and a stimulated cell width (n) that corresponds to a number of the cells across a length of the planar wings associated with the bi-wing hydraulic fracture;

determining a fracture conductivity diluting factor (FCDF) for the bi-wing hydraulic fracture in accordance with the following relationship:

$$FCDF = \frac{w_f * 2X_f}{n * D_x * D_y}$$

determining a fracture permeability ($K_f$) that corresponds to a permeability associated with stimulated formation rock of the hydrocarbon reservoir;

determining a model permeability ($K_{fm}$) for the bi-wing hydraulic fracture in accordance with the following relationship:

$$K_{fm} = FCDF * K_f$$

determining a reservoir model of the hydrocarbon reservoir that comprises the model permeability ($K_{fm}$) associated with the cells of the reservoir model that represent the region of the hydrocarbon reservoir that corresponds to the location of the bi-wing hydraulic fracture;

developing, based on the reservoir model, the hydrocarbon reservoir, wherein the developing the hydrocarbon reservoir comprises conducting a hydraulic fracturing stimulation to generate the bi-wing hydraulic fracture, the hydraulic fracturing stimulation comprising injecting a fracking fluid in the region of the hydrocarbon reservoir that corresponds to the location of the bi-wing hydraulic fracture;

generating, based on the reservoir model, a simulation of the hydrocarbon reservoir; and determining, based on the simulation of the hydrocarbon reservoir, an operating parameter for a given hydrocarbon well extending into the hydrocarbon reservoir, wherein developing the hydrocarbon reservoir comprises operating the given hydrocarbon well in accordance with the operating parameter.

6. The system of claim 5, wherein the well log for the hydrocarbon well comprises a pressure response log that is indicative of variation in pressure in the wellbore over time in response to the pumping of the fluids into the wellbore, and wherein one or more of the fracture half-length ($X_f$), the fracture height ($h_f$), the fracture width ($w_f$), and the fracture permeability ($K_f$) is determined based on the pressure response log.

7. The system of claim 6, wherein the well logging comprises a survey of a length of the wellbore of the hydrocarbon well, wherein the well log for the hydrocarbon well is indicative of extents of the bi-wing hydraulic fracture along the wellbore determined based on the survey of the length of the wellbore of the hydrocarbon well, and wherein the fracture height ($h_f$) is determined based on a distance between the extents of the bi-wing hydraulic fracture indicated by the well log for the hydrocarbon well.

8. The system of claim 5, the operations further comprising:

generating, based on the reservoir model, the simulation of the hydrocarbon reservoir; and determining, based on the simulation of the hydrocarbon reservoir, a drilling parameter for the given hydrocarbon well extending into the hydrocarbon reservoir, wherein developing the hydrocarbon reservoir comprises controlling drilling of the given hydrocarbon well in accordance with the drilling parameter.

9. A non-transitory computer readable storage medium comprising program instructions stored thereon that are executable by a processor to perform the following operations for developing a hydrocarbon well employing hydraulic fracturing:

conducting a well logging of the hydrocarbon well to determine a well log for the hydrocarbon well, wherein the well logging comprises pumping fluids into a wellbore of the hydrocarbon well;

determining a geometric signature of a bi-wing hydraulic fracture of the hydrocarbon well having the wellbore extending into a hydrocarbon reservoir, wherein the geometric signature of the bi-wing hydraulic fracture is determined based on the well logging of the hydrocarbon well, the geometric signature comprising:

a fracture height ($h_f$) corresponding to a height of planar wings associated with the bi-wing hydraulic fracture;

a fracture half-length ($X_f$) corresponding to a length of each of the planar wings associated with the bi-wing hydraulic fracture; and a fracture width ($w_f$) corresponding to a width of the planar wings associated with the bi-wing hydraulic fracture;

determining fracture model parameters for the bi-wing hydraulic fracture, the fracture model parameters comprising the following modeling parameters for cells of a model that represents a region of the hydrocarbon reservoir that corresponds to a location of the bi-wing hydraulic fracture:

a stimulated cell width ($D_y$) that corresponds to a width of the cells of the model that represents the region of the hydrocarbon reservoir that corresponds to the location of the bi-wing hydraulic fracture;

a stimulated cell length (Dr) that corresponds to a length of the cells of the model that represents the region of the hydrocarbon reservoir that corresponds to the location of the bi-wing hydraulic fracture; and a stimulated cell width (n) that corresponds to a number of the cells across a length of the planar wings associated with the bi-wing hydraulic fracture;

determining a fracture conductivity diluting factor (FCDF) for the bi-wing hydraulic fracture in accordance with the following relationship:

$$FCDF = \frac{w_f * 2X_f}{n * D_x * D_y}$$

determining a fracture permeability ($K_f$) that corresponds to a permeability associated with stimulated formation rock of the hydrocarbon reservoir;

determining a model permeability ($K_{fm}$) for the bi-wing hydraulic fracture in accordance with the following relationship:

$$K_{fm} = FCDF * K_f$$

determining a reservoir model of the hydrocarbon reservoir that comprises the model permeability ($K_{fm}$) associated with the cells of the reservoir model that represent the region of the hydrocarbon reservoir that corresponds to the location of the bi-wing hydraulic fracture;

developing, based on the reservoir model, the hydrocarbon reservoir, wherein the developing the hydrocarbon reservoir comprises conducting a hydraulic fracturing stimulation to generate the bi-wing hydraulic fracture, the hydraulic fracturing stimulation comprising injecting a fracking fluid in the region of the hydrocarbon reservoir that corresponds to the location of the bi-wing hydraulic fracture;

generating, based on the reservoir model, a simulation of the hydrocarbon reservoir; and determining, based on the simulation of the hydrocarbon reservoir, an operating parameter for a given hydrocarbon well extending into the hydrocarbon reservoir, wherein developing the hydrocarbon reservoir comprises operating the given hydrocarbon well in accordance with the operating parameter.

10. The medium of claim 9, wherein the well log for the hydrocarbon well comprises a pressure response log that is indicative of variation in pressure in the wellbore over time in response to the pumping of the fluids into the wellbore, and wherein one or more of the fracture half-length ($X_f$), the fracture height ($h_f$), the fracture width ($w_f$), and the fracture permeability ($K_f$) is determined based on the pressure response log.

11. The medium of claim 9,
wherein the well logging comprises a survey of a length of the wellbore of the hydrocarbon well,
wherein the well log for the hydrocarbon well is indicative of extents of the bi-wing hydraulic fracture along the wellbore determined based on the survey of the length of the wellbore of the hydrocarbon well, and
wherein the fracture height ($h_f$) is determined based on a distance between the extents of the bi-wing hydraulic fracture indicated by the well log for the hydrocarbon well.

* * * * *

UNITED STATES PATENT AND TRADEMARK OFFICE
CERTIFICATE OF CORRECTION

PATENT NO. : 11,933,165 B2
APPLICATION NO. : 17/201055
DATED : March 19, 2024
INVENTOR(S) : Tello Gomez et al.

It is certified that error appears in the above-identified patent and that said Letters Patent is hereby corrected as shown below:

In the Claims

Column 18, Claim 1, Line 31:
"(Dr)"
Should be changed to:
--(Dx)--;

Column 20, Claim 5, Line 34:
"(Dr)"
Should be changed to:
--(Dx)--;

Column 21, Claim 5, Line 6:
"reservoir comprises conducting a hydraulic fracturing"
Should be changed to:
--reservoir comprises controlling a hydraulic fracturing--;

Column 22, Claim 9, Line 17:
"(Dr)"
Should be changed to:
--(Dx)--; and

Column 22, Claim 9, Line 43:
"reservoir comprises conducting a hydraulic fracturing"
Should be changed to:
--reservoir comprises controlling a hydraulic fracturing--.

Signed and Sealed this
Sixteenth Day of April, 2024

*Katherine Kelly Vidal*
Katherine Kelly Vidal
*Director of the United States Patent and Trademark Office*